United States Patent
Gao et al.

(10) Patent No.: US 10,768,481 B2
(45) Date of Patent: Sep. 8, 2020

(54) DIRECT TYPE BACKLIGHT AND METHOD OF MANUFACTURING THE SAME, AND DISPLAY DEVICE

(71) Applicants: Hefei BOE Optoelectronics Technology Co., Ltd., Anhui (CN); BOE Technology Group Co., Ltd., Beijing (CN)

(72) Inventors: Lu Gao, Beijing (CN); Bing Zhang, Beijing (CN); Liang Gao, Beijing (CN); Jingbin Jie, Beijing (CN); Hai Tang, Beijing (CN)

(73) Assignees: Hefei BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/407,400

(22) Filed: May 9, 2019

(65) Prior Publication Data
US 2020/0089058 A1    Mar. 19, 2020

(30) Foreign Application Priority Data
Sep. 19, 2018    (CN) .......................... 2018 1 1093001

(51) Int. Cl.
*F21V 8/00* (2006.01)
*G02F 1/13357* (2006.01)
*G02B 27/09* (2006.01)
*G02B 27/30* (2006.01)

(52) U.S. Cl.
CPC .... *G02F 1/133606* (2013.01); *G02B 27/0955* (2013.01); *G02B 27/0972* (2013.01); *G02B 27/30* (2013.01); *G02F 1/133603* (2013.01)

(58) Field of Classification Search
CPC .................... G02B 6/003; G02F 2001/133607
See application file for complete search history.

(56) References Cited

U.S. PATENT DOCUMENTS

2004/0190304 A1* 9/2004 Sugimoto ............. H01L 33/507
362/555
2012/0063141 A1* 3/2012 Otsuka ................... H01L 33/58
362/268

* cited by examiner

*Primary Examiner* — Andrew J Coughlin
(74) *Attorney, Agent, or Firm* — Banner & Witcoff, Ltd.

(57) ABSTRACT

A direct type backlight source, a manufacturing method thereof, and a display device are disclosed, the direct type backlight includes a light emitting module including a substrate and a plurality of light emitting units arranged on the substrate; a lens film layer positioned on a light emitting side of the light emitting module, one side of the lens film layer away from the substrate is provided with a plurality of collimating structures arranged in an array, each of the collimating structures includes at least one convex surface structure, and the plurality of collimating structures are in one-to-one correspondence with the plurality of light emitting units.

20 Claims, 5 Drawing Sheets

DIRECT TYPE BACKLIGHT AND METHOD OF MANUFACTURING THE SAME, AND DISPLAY DEVICE

CROSS REFERENCE TO RELATED APPLICATIONS

The present application claims priority of Chinese Patent Application No. 201811093001.X filed on Sep. 19, 2018, the disclosure of which is incorporated herein by reference in its entirety as part of the present application.

TECHNICAL FIELD

Embodiments of the present disclosure relate to a direct type backlight and a method of manufacturing the same, and a display device.

BACKGROUND

A liquid crystal display (LCD) includes a liquid crystal display panel and a backlight disposed on the back side of the liquid crystal display panel. A backlight may be classified as being a direct type backlight and a side-in type backlight. A direct type backlight includes a light source, a diffusion sheet, a prism film layer and the like, and the diffusion sheet and the prism film layer are stacked in a direction away from the light source.

SUMMARY

At least one embodiment of the present disclosure provides a direct type backlight, the direct type backlight includes: a light emitting module including a substrate and a plurality of light emitting units arranged on the substrate; a lens film layer positioned on a light emitting side of the light emitting module. One side of the lens film layer away from the substrate is provided with a plurality of collimating structures arranged in an array, each of the collimating structures includes at least one convex surface structure; the plurality of collimating structures are in one-to-one correspondence with the plurality of light emitting units, and an area of an orthographic projection of each of light emitting units on the substrate is within an area of an orthographic projection of corresponding one of the collimating structures on the substrate.

For example, a light emitting surface of the light emitting units is disposed in direct contact with a light incident surface of the lens film layer.

For example, each of the collimating structures comprise a first convex surface structure and at least one annular convex surface structure arranged around the first convex curved structure, and a focal point of the first convex surface structure coincides with a focal point of the at least one annular convex surface structure.

For example, the annular convex surface structure is disposed around the first convex surface structure.

For example, the focal point of the first convex curved structure coincides with the light incident surface of the lens film layer.

For example, a radius of curvature of the annular convex surface structure is equal to a radius of curvature of the first convex surface structure.

For example, a plurality of blind holes arranged in an array are disposed on one side of the lens film layer close to the substrate.

For example, the plurality of light emitting units are disposed in one-to-one correspondence within the plurality of blind holes.

For example, the direct type backlight further includes a prism film layer positioned on one side of the lens film layer away from the substrate.

For example, a plurality of first bench-shaped protrusion structures arranged in an array are disposed on one side of the prism film layer close to the lens film layer, the plurality of the first bench-shaped structure are in one-to-one correspondence with the plurality of collimating structures, and an area where each of the collimating structures is located is within an area of an orthographic projection of corresponding one of the first bench-shaped protrusion structures on the lens film layer.

For example, a plurality of second bench-shaped protrusion structures arranged in an array are disposed on one side of the prism film layer away from the lens film layer, the plurality of the second bench-shaped structure are in one-to-one correspondence with the plurality of first bench-shaped structures, and an orthographic projection of each of the second bench-shaped protrusion structures on the lens film layer coincides with an orthographic projection of corresponding one of the first bench-shaped protrusion structures on the lens film layer.

For example, each of the first bench-shaped protrusion structures has a first surface parallel to an arrangement surface of the plurality of light emitting units, and an orthographic projection of the first convex surface structure of each of the collimating structures on the first bench-shaped protrusion structures coincides with the first surface; and each of the second bench-shaped protrusion structures has a second surface parallel to the arrangement surface of the plurality of light emitting units, and an orthographic projection of the first convex surface structure of each of the collimating structures on the second bench-shaped protrusion structures coincides with the second surface.

For example, the first bench-shaped protrusion structures and the second bench-shaped protrusion structures are both prismatic structures.

For example, the first bench-shaped protrusion structures and the second bench-shaped protrusion structures are both truncated cone structure.

At least one embodiment of the present disclosure provides a method of manufacturing a direct type backlight, the method includes providing a light emitting module, the light emitting module comprising a substrate and a plurality of light emitting units arranged on the substrate; and providing a lens film layer on a light emitting side of the light emitting module. One side of the lens film layer away from the substrate is provided with a plurality of collimating structures arranged in an array, and each of the collimating structures comprises at least one convex surface structure; the plurality of collimating structures are in one-to-one correspondence with the plurality of light emitting units, and an area of an orthographic projection of each of light emitting units on the substrate is within an area of an orthographic projection of corresponding one of the collimating structures on the substrate.

For example, each of the collimating structures comprise a first convex surface structure and at least one annular convex surface structure arranged around the first convex curved structure, and a focal point of the first convex surface structure coincides with a focal point of the at least one annular convex surface structure.

For example, the method further includes providing a prism film layer on one side of the lens film layer away from the substrate.

For example, a plurality of first bench-shaped protrusion structures arranged in an array are disposed on one side of the prism film layer close to the lens film layer, the plurality of the first bench-shaped structure are in one-to-one correspondence with the plurality of collimation structures, and an area where each of the collimation structures is located is within an area of an orthographic projection of corresponding one of the first bench-shaped protrusion structures on the lens film layer.

For example, a plurality of second bench-shaped protrusion structures arranged in an array are disposed on one side of the prism film layer away from the lens film layer, the plurality of the second bench-shaped structure are in one-to-one correspondence with the plurality of first bench-shaped structures, and an orthographic projection of each of the second bench-shaped protrusion structures on the lens film layer coincides with an orthographic projection of corresponding one of the first bench-shaped protrusion structures on the lens film layer.

At least one embodiment of the present disclosure provides a display device, the display device includes any one of the direct type backlight described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Similarly, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A traditional direct type backlight typically uses a light-emitting diode (LED) array as a light source. The light emitted by the LED array is transmitted through a diffusion sheet and a prism film layer and then is incident to a liquid crystal display panel.

However, because the divergence angle of the emitted light of an LED is large, the divergence angle of the light emitted from the direct type backlight is large, the viewing angle of the liquid crystal display using the direct type backlight is large, and the traditional direct type backlight cannot be applied to display products with requirements of narrow viewing angle.

At least one embodiment of the present disclosure provides a direct type backlight and a display device, which can solve the problem that the traditional direct type backlight cannot be applied to the field of display products with requirements of narrow viewing angle.

Figure 1:
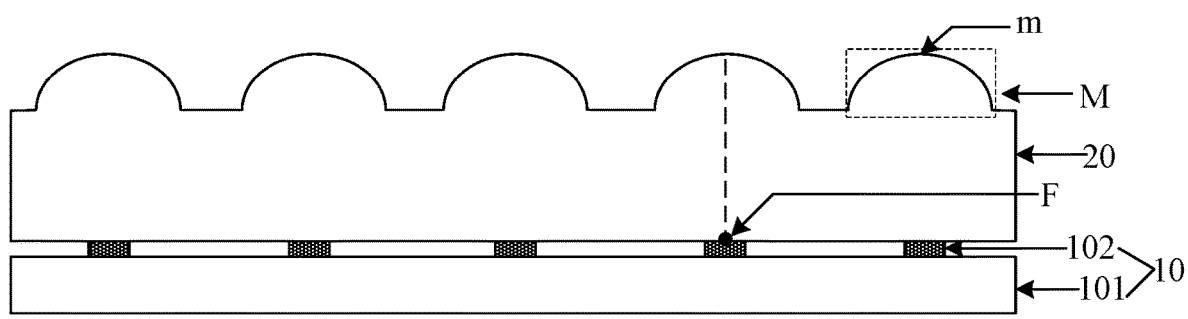
FIG. 1 is a schematic structural diagram of a direct type backlight provided by at least one embodiment of the present disclosure.

FIG. 1 is a schematic structural diagram of a direct type backlight provided by at least one embodiment of the present disclosure, and as shown in FIG. 1, the direct type backlight includes: a light emitting module 10 and a lens film layer 20 positioned on the light emitting side of the light emitting module 10.

The light emitting module 10 includes a substrate 101 and a plurality of light emitting units 102 arranged in an array on the substrate 101, the lens film layer 20 is disposed on a side away from the substrate 101 with a plurality of collimating structures M arranged in an array, and the collimating structures M each include at least one convex surface structure m.

The plurality of collimating structures M are in one-to-one correspondence with the plurality of light emitting units 102, and an area of an orthographic projection of each of light emitting units 102 on the substrate 101 is within an area of an orthographic projection of corresponding one of the collimating structures M on the substrate 101.

It should be noted that the collimating structures can collimate light passing them, and after collimation divergent light is concentrated, so that the lens film layer functions as a convex lens.

For example, the material of the lens film layer is glass or polymethyl methacrylate (PMMA), PMMA is also called organic glass, and the embodiments of the present disclosure is not limitative to the material of the lens film layer.

For example, when the material of the lens film layer is PMMA, the lens film layer can be formed by thermal imprinting, hot stamping, hot embossing or injection molding; when the material of the lens film layer is glass, the lens film layer can be formed by a patterning process. The patterning process includes: photoresist coating, exposure, development, etching, and photoresist stripping.

In at least one embodiment of the present disclosure, the function of the convex surface structure is the same as that of a convex lens, and therefore, the convex surface structure can be regarded as a convex lens.

For example, the light emitting units provided by at least one embodiment of the present disclosure may be an LED, a mini-LED, a chip scale package (CSP) with a light emitting device, or a micro blue chip, etc., which is not limited by at least one embodiment of the present disclosure. The substrate may be a printed circuit board (PCB). For example, a plurality of light emitting units may be bonded to the PCB to obtain a light emitting module, or a plurality of light emitting units may be molded on the PCB to obtain a light emitting module.

At least one embodiment of the present disclosure provides a direct type backlight by providing a plurality of collimating structures arranged in an array on a side of the lens film layer away from the substrate, the plurality of collimating structures are arranged in one-to-one correspondence with the plurality of light emitting units, and the light emitted by the light emitting units is incident on the lens film layer. Because the collimating structures include at least one convex surface structure, the at least one convex surface structure can concentrate the light emitted from the lens film layer, and reduce the divergence angle of the emitted light, which in turn reduces the divergence angle of the emitted light of the direct type backlight. The direct type backlight can be applied to display products with requirements of narrow viewing angle.

Figure 2:
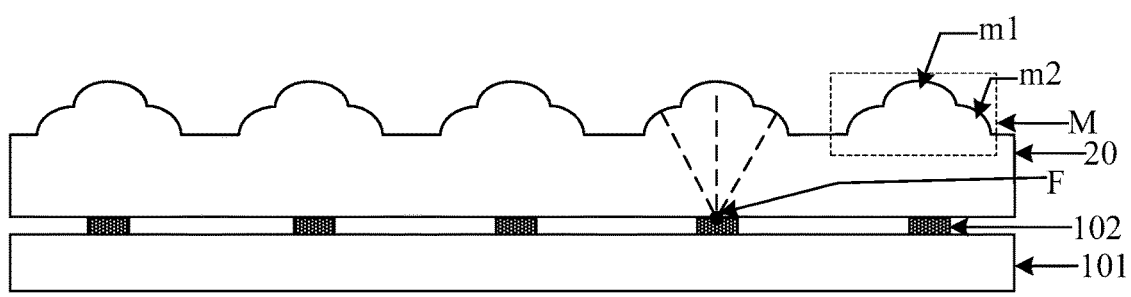
FIG. 2 is a schematic structural diagram of another direct type backlight provided by at least one embodiment of the present disclosure.

FIG. 2 is a schematic structural diagram of another direct type backlight provided by at least one embodiment of the present disclosure. As shown in FIG. 2, each of the collimating structures M includes a first convex surface structure m1 and at least one annular convex surface structure m2 (e.g., one annular convex surface structure) arranged around the first convex curved structure m1, that is, there is no space between the first convex surface structure and the at least one annular convex surface structure, and the focal point of the first convex surface structure m1 coincides with the focus of the at least one annular convex surface structure m2.

For example, each of the collimating structures includes at least one annular convex surface structure, that is, the collimating structures include one or more annular convex surface structure, and the number of the annular convex surface structure of each of the collimating structures is not limited in the embodiments of the present disclosure. One annular convex surface structure included in the collimating structure will be illustrated as an example in the following description. The function of the annular convex surface structure is the same as that of an annular convex lens, and therefore, the annular convex surface structure can be regarded as an annular convex lens.

For example, referring to FIG. 2, the first convex surface structure m1 and the annular convex surface structures m2 may be equivalent to three convex lenses in all the longitudinal sections, and the longitudinal sections are perpendicular to the arrangement surface of the light emitting units. Optionally, the structures of the three convex lenses are identical, the first convex surface structure m1 is equivalent to a standard convex lens, and the annular convex surface structure m2 is equivalent to inclined convex lenses respectively disposed on two sides of the standard convex lens in each longitudinal section.

Figure 3:
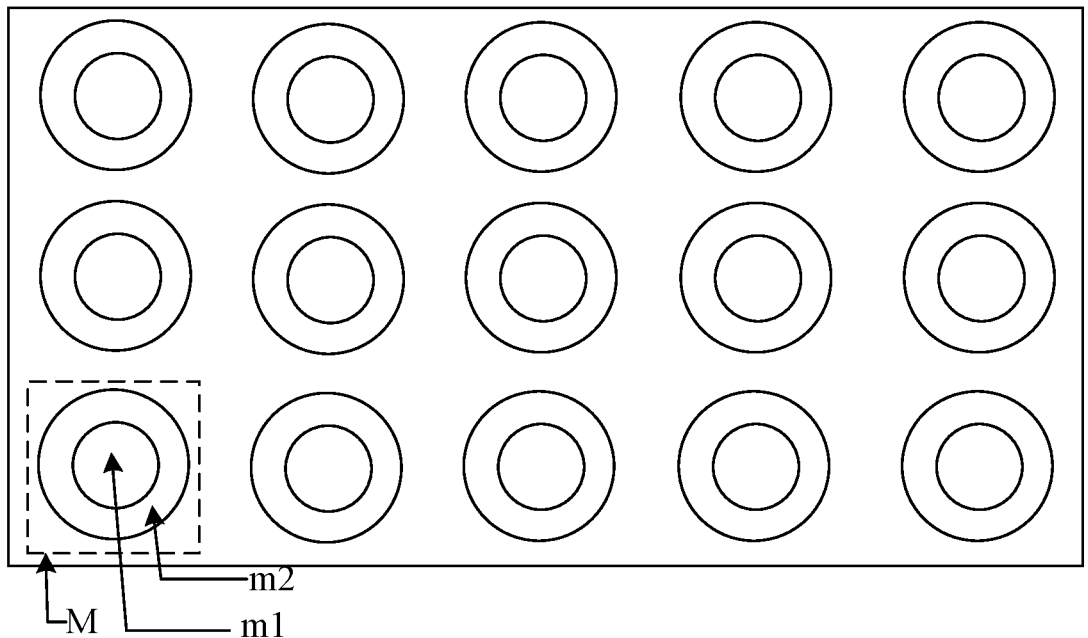
FIG. 3 is a top view of the direct type backlight illustrated in FIG. 2.

FIG. 3 is a top view of the direct type backlight illustrated in FIG. 2. As shown in FIG. 3, in each of the collimating structures M, the annular convex surface structure m2 is disposed around the first convex surface structure m1. The top view of the first convex surface structure is a circular shape, and the top view of the annular convex surface structure is an annular shape, and the circular and annular shapes are concentric.

For example, referring to FIG. 1 or FIG. 2, the light emitting surface of the light emitting units 102 is disposed in direct contact with the light incident surface of the lens film layer 20, and a focal point F of the first convex surface structure m1 coincides with the light incident surface of the lens film layer 20, i.e., is at the light incident surface of the lens film layer 20.

It should be noted that, a focal point of the annular convex surface structure coincides with a focal point of the first convex surface structure, the focal point of the annular convex surface structure also coincides with the light incident surface of the lens film layer, so the light emitted by each light emitting unit can uniformly reach corresponding one of the collimating structures after being incident to the lens film layer, and the corresponding one of collimating structure can uniformly converge the emitted light, and maintain the uniformity of the emitted light while reducing the divergence angle of the emitted light.

As for a convex lens, the light incident through a focal point emits in a direction parallel to the main optical axis after being refracted by the convex lens. Since the focal point of the first convex surface structure coincides with the light incident surface of the lens film layer and the function of the first convex surface structure is the same as that of a standard convex lens, the light emitted from the first convex surface structure becomes parallel light perpendicular to the arrangement surface of the light emitting units. Assuming that the central axis of the first convex surface structure is a zero axis, the angle of the light emitted from the first convex surface structure is 0°. In at least one embodiment of the present disclosure, by providing an annular convex surface structure, the direct type backlight can provide emitted light with a certain divergence angle to ensure that the display device has multiple viewing angles.

For example, the radius of curvature of the annular convex surface structure is equal to the radius of curvature of the first convex surface structure, that is, the curvature of the curved surface of the annular convex surface structure is equal to the curvature of the curved surface of the first convex surface structure, and the refraction effects by the annular convex surface structure and the first convex surface structure to the light with the same incidence angle are the same, such that the light can be evenly emitted from the lens film layer.

It should be noted that, by adjusting the radius of curvature of the first convex surface structure and the radius of curvature of the second convex surface structure in the collimating structures, the refraction angle of the light with respect to the light emitting surface of the lens film layer can be adjusted, thereby the divergence angle of the light can be adjusted.

Figure 4:
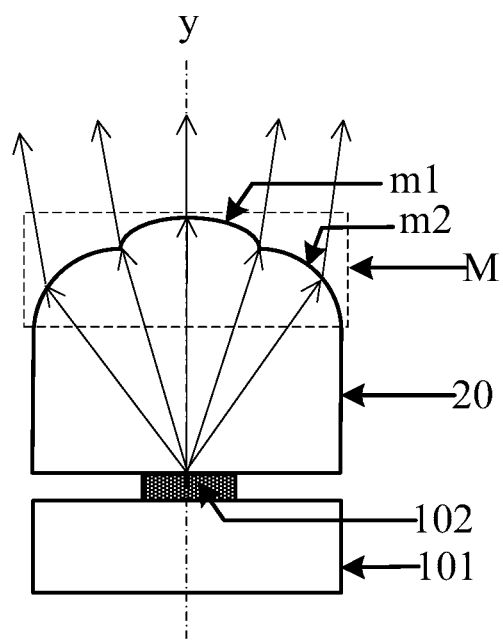
FIG. 4 is a schematic diagram of local light transmission in the direct type backlight illustrated in FIG. 2.

FIG. 4 is a schematic diagram of partial light transmission in the direct type backlight illustrated in FIG. 2. As shown in FIG. 4, after the light emitted from the light emitting unit 102 is incident on the lens film layer 20, the light is emitted from the collimating structures on one side of the lens film layer 20 away from the substrate layer 101. Since each of the collimating structures M consists of the convex surface structure m1 and at least one annular convex surface structure m2, the light is converged when the light is emitted from the surface of the convex surface structure m1 and the annular convex surface structure m2, so that the divergence angle of the light can be reduced.

Figure 5:
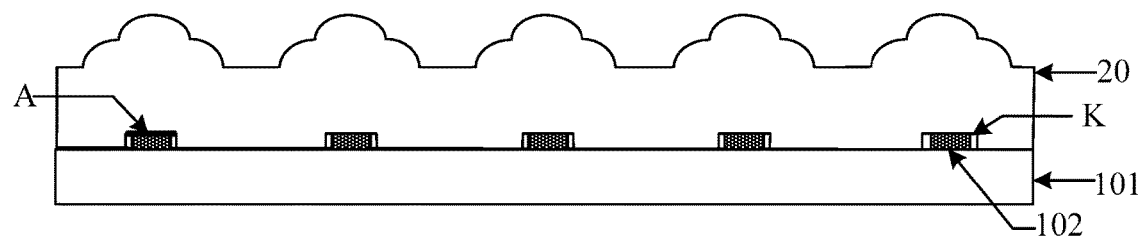
FIG. 5 is a schematic structural diagram of further direct type backlight provided by at least one embodiment of the present disclosure.

For example, FIG. 5 is a schematic structural diagram of still another direct type backlight provided by at least one embodiment of the present disclosure. As shown in FIG. 5, a plurality of blind holes K arranged in an array are disposed on one side of the lens film layer 20 close to (abutting) the substrate 101, the plurality of light emitting units 102 are disposed in one-to-one correspondence within the plurality of blind holes K.

For example, the size of the blind holes is matched (compatible) with the size of the light emitting units such that the light emitting surface of the light emitting units may be in direct contact with a light incident surface of the lens film layer. The light incident surface of the lens film layer refers to a surface that is disposed opposite to the light emitting surface of the light emitting units. Referring to FIG. 5, the light incident surface of the lens film layer 20 is the surface A.

It should be noted that, in the direct type backlight illustrated in FIG. 1 or FIG. 2, a support structure may be disposed on the substrate to support the lens film layer, and the relative arrangement of the lens film layer and the light emitting module is not limited in at least one embodiment of the present disclosure.

Figure 6:
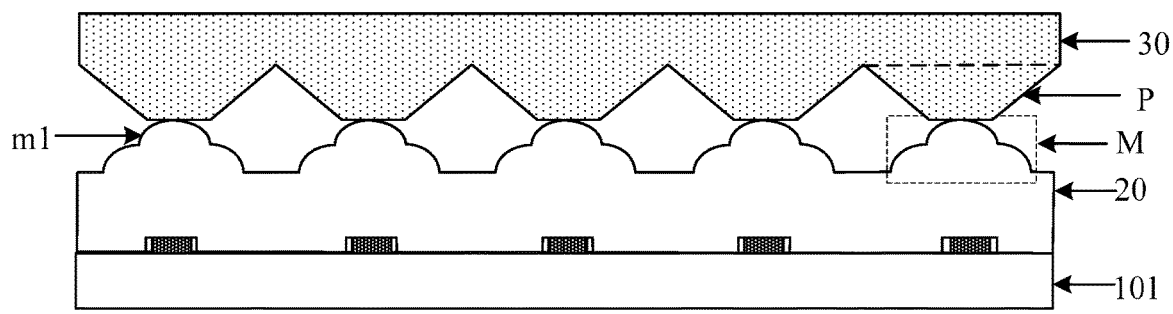
FIG. 6 is a schematic structural diagram of still another direct type backlight provided by at least one embodiment of the present disclosure.
Figure 7:
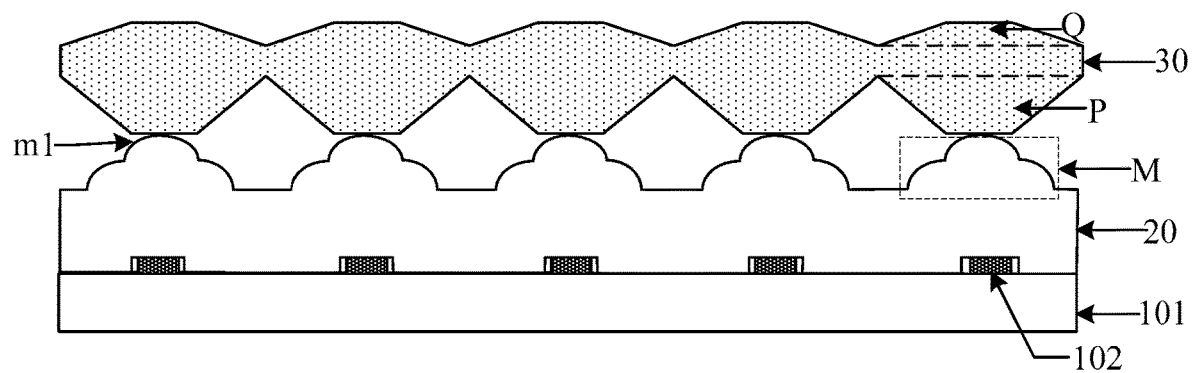
FIG. 7 is a schematic structural diagram of still another direct type backlight provided by at least one embodiment of the present disclosure.

For example, referring to FIG. 6 or FIG. 7, the direct type backlight further includes a prism film layer 30 positioned on one side of the lens film layer 20 away from the substrate 101.

FIG. 6 is a schematic view showing the structure of a direct type backlight provided with a prism film layer. As shown in FIG. 6, a plurality of inverted first bench-shaped protrusion structures P arranged in an array are disposed on one side of the prism film layer 30 close to (abutting) the lens film layer 20, the plurality of the first bench-shaped structures P are in one-to-one correspondence with the plurality of collimation structures M, and an area where each of the collimation structures M is located is within an area of an orthographic projection of corresponding one of the first bench-shaped protrusion structures P on the lens film layer, for example.

For example, each of the first bench-shaped protrusion structures has a first surface parallel to an arrangement surface of the plurality of light emitting units, and an orthographic projection of one first convex surface structure on corresponding one of the first bench-shaped protrusion structures coincides with the first surface.

It should be noted that the light emitted from the lens film layer can be divided into two parts: the light emitted from the first convex surface structure and the light emitted from the annular convex surface structure.

By providing an inverted first bench-shaped protrusion structures on a side of the prism film layer close to the lens film layer, and making the orthographic projection of a first convex surface structure on a first bench-shaped protrusion structure coincide with the first surface of the first bench-shaped protrusion structure, such that the light emitted from the first convex surface structure may be incident to a first surface of the first bench-shaped protrusion structures, that is, the prism film layer does not change the transmission direction of the light emitted from the first convex surface structure; and the light emitted from the annular convex surface structure can be incident to one side of the first bench-shaped protrusion structures, and the side of the first bench-shaped protrusion structures can converge the light, thus the prism film layer can realize the convergence effect on the light, and the divergence angle of the light is further reduced.

FIG. 7 is a schematic view showing the structure of another direct type backlight provided with a prism film layer. As shown in FIG. 7, a plurality of inverted first bench-shaped protrusion structures P arranged in an array are disposed on one side of the prism film layer 30 close to the lens film layer 20, the plurality of the first bench-shaped structures P are in one-to-one correspondence with the plurality of collimation structures M, and an area where each of the collimation structures M is located is within an area of an orthographic projection of corresponding one of the first bench-shaped protrusion structures P on the lens film layer; a plurality of upward second bench-shaped protrusion structures Q arranged in an array are disposed on one side of the prism film layer 30 away from the lens film layer 20, the plurality of the second bench-shaped structures Q are in one-to-one correspondence with the plurality of first bench-shaped protrusion structures P, and an area of an orthographic projection of each of the first bench-shaped protrusion structures P on the lens film layer 20 is correspondingly within an area of an orthographic projection of each of the second bench-shaped protrusion structures Q on the lens film layer 20.

For example, each of the first bench-shaped protrusion structures has a first surface parallel to an arrangement surface of the plurality of light emitting units, and an orthographic projection of the first convex surface structure of corresponding one of the collimating structures on the first bench-shaped protrusion structure coincides with the first surface of the first bench-shaped protrusion structure; and each of the second bench-shaped protrusion structures has a second surface parallel to the arrangement surface of the plurality of light emitting units, and an orthographic projection of the first convex surface structure of corresponding one of the collimating structures on the second bench-shaped protrusion structure coincides with the second surface of the second bench-shaped protrusion structure.

It should be noted that the light emitted from the lens film layer can be divided into two parts: the light emitted from the first convex surface structure and the light emitted from the annular convex surface structure.

By providing an inverted first bench-shaped protrusion structure on a side of the prism film layer close to the lens film layer so that the orthographic projection of the first convex surface structure on the first bench-shaped protrusion structure coincides with the first surface of this first bench-shaped protrusion structure, and providing an upward second bench-shaped protrusion structure on order side of the prism film layer away from the lens film layer so that the orthographic projection of the first convex surface structure on the second bench-shaped protrusion structure coincides with the second surface of this second bench-shaped protrusion structures, such that the light emitted from the first convex surface structures may be incident to a first surface of the bench-shaped protrusion structure and then be emitted from a second surface of the second bench-shaped protrusion structure. The first surface and the second surface are arranged in parallel and are parallel to the arrangement surface of the light emitting units, that is, the prism film layer does not change the transmission direction of the light emitted from the first convex surface structures; and the light emitted from the annular convex surface structures may be incident to one side of the first bench-shaped protrusion structure and then be emitted from one side of the second bench-shaped protrusion structure. The side of the first bench-shaped protrusion structure and the side of the second bench-shaped protrusion structure can both converge the light, and the prism film layer can converge the light emitted from the annular convex surface structure twice, which further improves the convergence effect of prism film layer on light and then reduces the divergence angle of the light to a greater degree.

For example, the first bench-shaped protrusion structures and the second bench-shaped protrusion structures satisfy one design of the following: the first bench-shaped protrusion structures and the second bench-shaped protrusion structures are both prismatic structures; the first bench-shaped protrusion structures and the second raised structure are both truncated cone structures.

For example, the prism film layer can be prepared from a polyethylene terephthalate (PET) material, and the first bench-shaped protrusion structures and/or the second bench-shaped protrusion structures can be formed by thermal imprinting, hot stamping, or hot embossing. The prism film layer may also be prepared by other materials, and the material of the prism film layer is not limited by at least one embodiment of the present disclosure.

Figure 8:
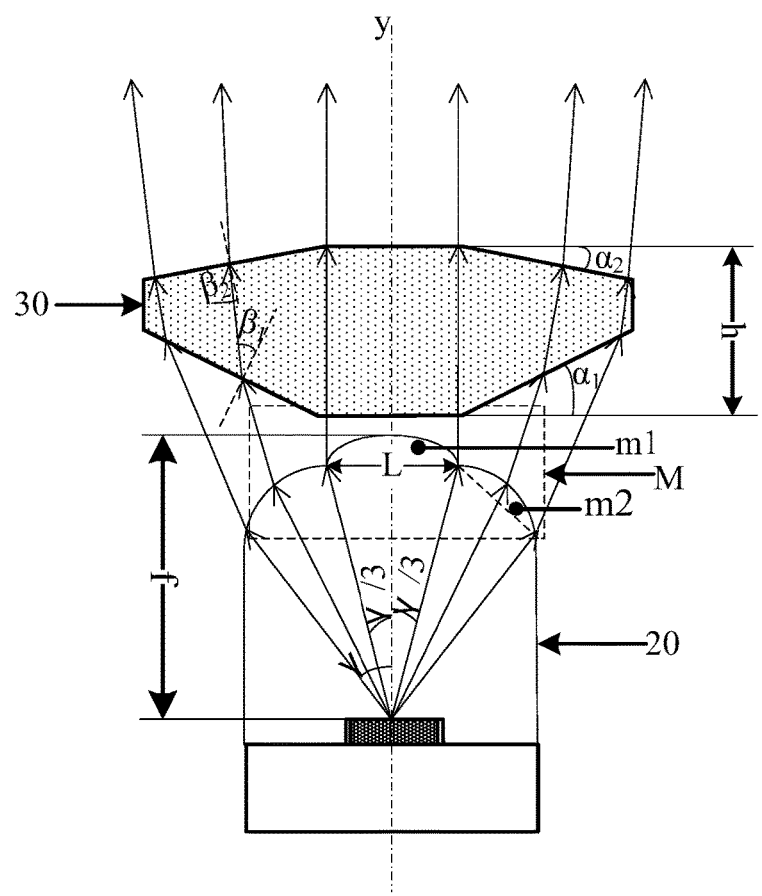
FIG. 8 is a schematic diagram of partial light transmission in the direct type backlight illustrated in FIG. 7.

FIG. 8 is a schematic diagram of partial light transmission in the direct type backlight illustrated in FIG. 7. As shown in FIG. 8, the total reflection angle of light entering the lens film layer 20 is γ, that is, among the light emitted by the light emitting units, the light with an incident angle greater than or equal to γ are totally reflected by the light incident surface of the lens film layer 20 and cannot enter the lens film layer 20. The central axis y of the first convex surface structure m1 is zero axis, and the angle of the light entering the lens film layer 20 ranges from −γ to γ, which case is denoted as (−γ, γ). Assuming that the structures of the three convex lenses equivalently obtained by the first convex surface structure m1 and the annular convex surface structures m2 are identical and the focal points of the three convex lenses coincide, the light entering the lens film layer 20 can uniformly reach the collimating structure M. The light entering the lens film layer 20 can be divided into two parts: the first part of light reaches the first convex surface structure m1, and the second part of light reaches the annular convex surface structures m2, and the first part of light has an angle range of (−γ/3, γ/3), and the second part of the light has an angle range of (−γ, −γ/3) and (γ/3, γ).

For example, when the material of the lens film layer is PMMA, it is known that the total reflection angle of the PMMA material is about 42°; the central axis of the first convex surface structure is zero axis, and the light with an angle range of (−14°, 14°) reaches the first convex surface, and the light with an angle range of (−42°, −14°) and an angle range of (14°, 42°) reaches the annular convex surface structure.

It should be noted that, in the direct type backlight provided by at least one embodiment of the present disclosure, precise adjustment of the divergence angle of the emitted light of the direct type backlight can be achieved by parameter design of the lens film layer and the prism film layer. Assuming that, in the direct type backlight illustrated in FIG. 7, the structures of the three convex lenses provided by the first convex surface structure and the annular convex surface structure equivalently on the longitudinal sections of the lens film layer are completely the same, the parameter design process of the lens film layer and the prism film layer is illustrated by an example of the direct type backlight illustrated in FIG. 7.

Referring to FIG. 8, the parameters of the lens film layer include: a radius of curvature r of a convex lens, a focal length f of the convex lens (i.e., a distance from the focal point to the center of the convex surface), and a aperture width L of the convex lens; the parameters of the prism film layer include: the angle $\alpha_1$ between the side of a first bench-shaped protrusion structure and the first surface of the first bench-shaped protrusion structure, the angle $\alpha_2$ between the side of a second bench-shaped protrusion structure and the second surface of the second bench-shaped protrusion structure, and the thickness h of the prism film layer.

The process of designing the parameters of the lens film layer is described in the following.

It is known that the refractive index of the lens film layer is $n_1$, and the total reflection angle of light entering the lens film layer is γ. The aperture width L of the convex lens, the total reflection angle γ of the lens film layer, and the focal length f of the convex lens satisfy the formula (1): L=2×f×cos(γ/3); and the radius of curvature r of the convex lens, the focal length f of the convex lens, and the refractive index n of the film layer satisfies the formula (2): r=f×($n_1$−1). Here, f in formula (1) and formula (2) is assigned an initial value, and the value of f can be changed by using an optical simulation software. When a value of f can cause the lens film layer to achieve a predetermined collimation effect on incident light, this value f is the focal length of the lens film layer to be designed. According to the assigned value of f, combined with the above formula (1) and formula (2), the values of L and r can be calculated, that is, the parameters of the lens film layer are obtained: the radius of curvature of the convex lens r, the focal length f of the convex lens and the aperture width L of the convex lens.

Further, the process of designing the parameters of the prism film layer is described in the following.

Here, the refractive index of the prism film layer is $n_2$. The aperture width L of the convex lens (i.e., the size of the first surface of the first bench-shaped protrusion structure and the size of the second surface of the second bench-shaped protrusion structure), the thickness h of the prism film layer, and the total reflection angle γ of the lens film layer satisfy the formula (3): L=2×h×tan(γ/3)°. After the parameters of the lens film layer are determined, the thickness h of the prism film layer can be calculated according to the determined aperture width L of the convex lens in combination with the formula (3). The emitting angle of the light from one side of the first bench-shaped protrusion structure is $\beta_1$, and the incident angle of the light to one side of the second bench-shaped protrusion structure is $\beta_2$. According to the principle of light refraction, $\beta_1$, $\beta_2$, $\alpha_1$, $\alpha_2$, the total reflection angle γ of the lens film layer and the refractive index $n_2$ of the prism film layer satisfy the following three formulas:

$$\sin \alpha_2 = n_2 \times \sin \beta_2, \quad \text{formula 4(a):}$$

$$\sin(\gamma/3 + \alpha_1) = n_2 \times \sin \beta_1, \text{ and} \quad \text{formula 4(b):}$$

$$\alpha_1 + \alpha_2 = \beta_1 + \beta_2. \quad \text{formula 4(c):}$$

It can be obtained from formula 4(a) that $\beta_2=\arcsin(\sin\alpha_1/n_2)$, it can be obtained from formula 4(b) that $\beta_1=\arcsin(\sin(\gamma 2/3+\alpha_1)/n_2)$, $\beta_2$ and $\beta_1$ are substituted into formula 4(c) to obtain the relationship between $\alpha_1$ and $\alpha_2$, by assigning a value to any one of $\alpha_1$ and $\alpha_2$, the value of the other can be obtained, and finally the following parameters of the prism film layer are obtained: the angle $\alpha_1$ between the side of the first bench-shaped protrusion structures and the first surface of the first bench-shaped protrusion structure, the angle $\alpha_2$ between the side of the second bench-shaped protrusion structures and the second surface of the second bench-shaped protrusion structures, and the thickness h of the prism film layer.

During the optimization process of the lens film layer and the prism film layer, the value of at least one parameter may be continuously adjusted by optical simulation software, for example, the at least one parameter may include a focal length f of the convex lens, and the angle $\alpha_1$ between the side of the first bench-shaped protrusion structures and the first surface of the first bench-shaped protrusion structure, the angle $\alpha_2$ between the side of the second bench-shaped protrusion structures. When the simulation result satisfies the preset light divergence angle, other parameters except the previous at least one parameter can be obtained by calculating according to the present f, $\alpha_1$ and $\alpha_2$ in connection with the above formulas, thus the parameter design of the lens film layer and the prism layer can be realized.

For example, when the material of the lens film layer is PMMA, it is known that the total reflection angle of the PMMA material is about 42°, and the central axis of the first convex surface structure is zero axis, and among the light emitted from the light emitting units, the light with an angle range of (−14°, 14°) reaches the first convex surface, and is emitted at the emitting angle of 0°; and the light with an angle range of (−42°, −14°) and an angle range of (14°, 42°) reaches the annular convex surface structure. Since the focal point of the annular convex surface structure is disposed on the light incident surface of the lens film layer and the function of the annular convex surface structure is the same as that of the convex lens, the light reaching the annular convex surface structure is emitted in parallel at an emitting angle of 28°. Further, the light which is emitted in parallel from the annular convex surface at an emitting angle of ±28° converge when that light passes through the first bench-shaped protrusion structures and the second bench-shaped protrusion structures of the prism film layer, so the angle of this part of the light emitted from the prism is in the range of −20° and +20°. Therefore, the divergence angle of the emitted light of the direct type backlight provided by at least one embodiment of the present disclosure can achieve a half bright angle of ±10° and a cutoff angle of ±20°. The half bright angle refers to the angle at which the brightness is half of the maximum brightness, and the maximum brightness is the brightness in the direction perpendicular to the light emitting surface of the direct-type backlight; the cutoff angle refers to the angle at which the brightness is zero.

For example, in a direct type backlight provided by at least one embodiment of the present disclosure, a side of the substrate away from the lens film layer may be provided with a reflective layer, and the reflective layer may be formed by coating a reflective material or attaching a reflective sheet. It should be noted that the reflective layer that is disposed on one side of the substrate away from the lens film layer can reflect the light escaping from the substrate into the lens film layer, thereby improving light utilization efficiency.

At least one embodiment of the present disclosure provides a direct type backlight by providing a plurality of collimating structures arranged in an array on a side of the lens film layer away from the substrate, the plurality of collimating structures are arranged in one-to-one correspondence with the plurality of light emitting units, and the light emitted by the light emitting units is incident on the lens film layer. Since the collimating structures includes at least one convex surface structure, the at least one convex surface structure can concentrate the light emitted from the lens film layer, and reduce the divergence angle of the emitted light, the concentrated light enters the prism film layer, and the light is further concentrated by the bench-shaped protrusion structures on the prism film layer, which in turn reduces the divergence angle of the emitted light of the direct type backlight. The direct type backlight can be applied to display products with requirements of narrow viewing angle.

Figure 9:
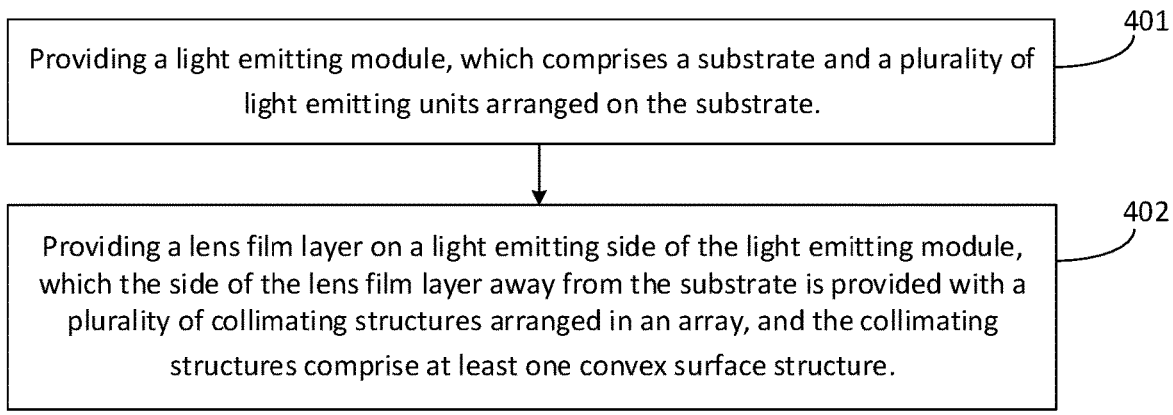
FIG. 9 is a flow chart of a method of manufacturing the direct type backlight provided by at least one embodiment of the present disclosure.

FIG. 9 is a flow chart of a method of manufacturing the direct type backlight provided by at least one embodiment of the present disclosure. As shown in FIG. 9, the method includes the following work process:

In step 401, a light emitting module is provided.

The light emitting module comprising a substrate and a plurality of light emitting units arranged on the substrate.

In step 402, a lens film layer is provided on a light emitting side of the light emitting module.

One side of the lens film layer away from the substrate is provided with a plurality of collimating structures arranged in an array, and the collimating structures comprise at least one convex surface structure.

The plurality of collimating structures are in one-to-one correspondence with the plurality of light emitting units, and an area of an orthographic projection of each of the light emitting units on the substrate is within an area of an orthographic projection of corresponding one of the collimating structures on the substrate.

At least one embodiment of the present disclosure provides a manufacturing method of a direct type backlight by providing a plurality of collimating structures arranged in an array on a side of the lens film layer away from the substrate, the plurality of collimating structures are arranged in one-to-one correspondence with the plurality of light emitting units, and the light emitted by the light emitting units is incident on the lens film layer. Since the collimating structures includes at least one convex surface structure, the at least one convex surface structure can concentrate the light emitted from the lens film layer, and reduce the divergence angle of the emitted light, which in turn reduces the divergence angle of the emitted light of the direct type backlight. The direct type backlight can be applied to display products with requirements of narrow viewing angle.

Figure 10:
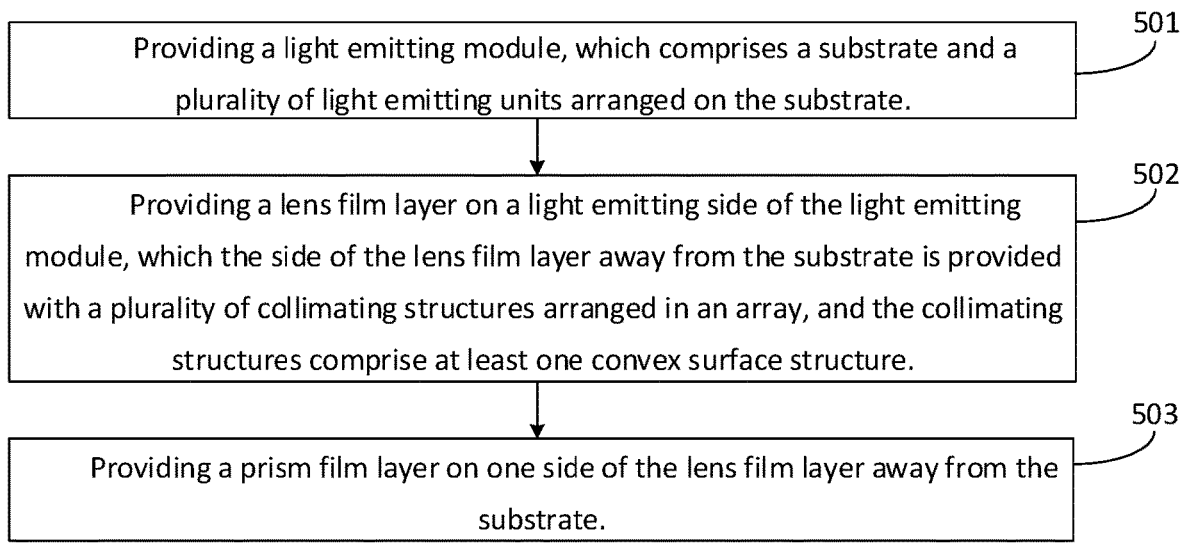
FIG. 10 is a flow chart of a method of manufacturing another direct type backlight provided by at least one embodiment of the present disclosure.

FIG. 10 is a flow chart of a method of manufacturing another direct type backlight provided by at least one embodiment of the present disclosure. As shown in FIG. 10, the method includes the following work process:

In step 501, a light emitting module is provided.

The light emitting module comprising a substrate and a plurality of light emitting units arranged on the substrate.

For example, the light emitting units provided by at least one embodiment of the present disclosure may be an LED, a mini LED, a chip scale package, or a micro blue chip, etc., which is not limited by at least one embodiment of the present disclosure. The substrate may be a printed circuit board (PCB). For example, a plurality of light emitting units may be bonded to the PCB to obtain a light emitting module, or a plurality of light emitting units may be molded on the PCB to obtain a light emitting module.

In step 502, a lens film layer is provided on a light emitting side of the light emitting module.

One side of the lens film layer away from the substrate is provided with a plurality of collimating structures arranged in an array, and the collimating structures comprise at least one convex surface structure;

The plurality of collimating structures are in one-to-one correspondence with the plurality of light emitting units, and an area of an orthographic projection of each of light emitting units on the substrate is within an area of an orthographic projection of the corresponding one of the collimating structures on the substrate.

For example, the collimating structures comprise a first convex surface structure and at least one annular convex surface structure arranged around the first convex curved structure, and a focal point of the first convex surface structure coincides with a focal point of the at least one annular convex surface structure.

For example, the material of the lens film layer is glass or PMMA, PMMA is also called organic glass, and at least one embodiment of the present disclosure is not limitative to the material of the lens film layer.

For example, when the material of the lens film layer is PMMA, the lens film layer can be formed by thermal imprinting, hot stamping, hot embossing, or injection molding; when the material of the lens film layer is glass, the lens film layer can be formed by a patterning process. The patterning process includes: photoresist coating, exposure, development, etching, and photoresist stripping.

In step 503, a prism film layer is provided on one side of the lens film layer away from the substrate.

For example, a plurality of first bench-shaped protrusion structures arranged in an array are disposed on one side of the prism film layer close to the lens film layer, the plurality of the first bench-shaped structure are in one-to-one correspondence with the plurality of collimation structures, and an area where each of the collimation structures is located is within an area of an orthographic projection of corresponding one of the first bench-shaped protrusion structures on the lens film layer.

For example, a plurality of second bench-shaped protrusion structures arranged in an array are disposed on one side of the prism film layer away from the lens film layer, the plurality of the second bench-shaped structure are in one-to-one correspondence with the plurality of first bench-shaped structures, and an orthographic projection of each of the second bench-shaped protrusion structures on the lens film layer coincides with an orthographic projection of corresponding one of the first bench-shaped protrusion structures on the lens film layer.

For example, the prism film layer can be prepared from a PET material, and the first bench-shaped protrusion structures and/or the second bench-shaped protrusion structures can be formed by thermal imprinting, hot stamping, or hot embossing. The prism film layer may also be prepared by other material, and the material of the prism film layer is not limited by at least one embodiment of the present disclosure.

It should be noted that the sequence of the steps of the method of manufacturing the direct type backlight provided by at least one embodiment of the present disclosure may be appropriately adjusted, and the number of steps may be correspondingly increased or decreased according to different cases, and variations of method that any person skilled in the art may be readily conceived within the technical scope of the present disclosure should be within the scope of the present disclosure and which therefore will not be described again.

In summary, at least one embodiment of the present disclosure provides a manufacturing method of a direct type backlight by providing a plurality of collimating structures arranged in an array on a side of the lens film layer away from the substrate, the plurality of collimating structures are arranged in one-to-one correspondence with the plurality of light emitting units, and the light emitted by the light emitting units is incident on the lens film layer. Since the collimating structures includes at least one convex surface structure, the at least one convex surface structure can concentrate the light emitted from the lens film layer, and reduce the divergence angle of the emitted light, the concentrated light enters the prism film layer, and the light is further concentrated by the bench-shaped protrusion structures on the prism film layer, which in turn reduces the divergence angle of the emitted light of the direct type backlight. The direct type backlight can be applied to display products with requirements of narrow viewing angle.

Regarding the structure in the above method embodiment, the preparation manner and material of each film layer have been described in detail in the apparatus embodiment, and will not be described in detail herein.

At least one embodiment of the present disclosure further provides a display device.

Figure 11:
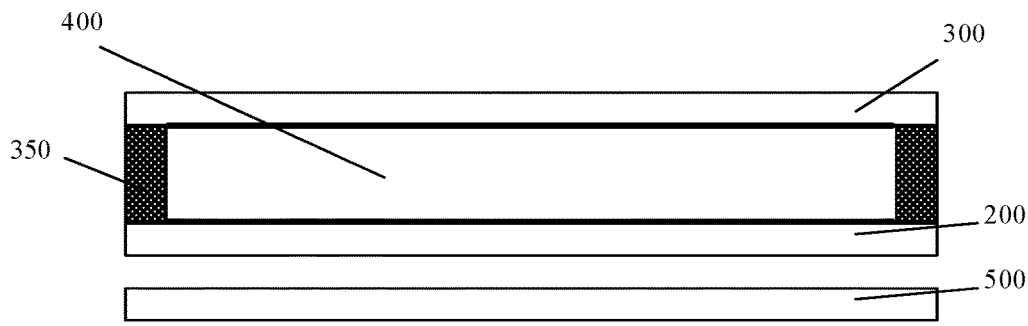
FIG. 11 is a schematic structural diagram of a display device according to at least one embodiment of the present disclosure.

As shown in FIG. 11, one example of the display device is a liquid crystal display, and the liquid crystal display includes a liquid crystal display panel and a backlight disposed on the back side of the liquid crystal display panel as shown in any of FIG. 1, FIG. 2, FIG. 5 to FIG. 7, the liquid crystal display panel includes an array substrate 200, a color filter substrate 300 opposed to the array substrate 200, and an liquid crystal layer 400 disposed between the array substrate 200 and the color filter substrate 300. The array substrate 200 and the color filter substrate are disposed opposite to each other and bonded to each other by a sealant 350 to form a liquid crystal cell, in which the liquid crystal material of the liquid crystal layer 400 is filled. The array substrate includes an array circuit, which includes pixel units arranged in an array and signal lines such as gate lines and data lines used for the pixel units, and a pixel electrode of each of the pixel units is used for applying an electric field to rotate the liquid crystal material, such that the rotation degree is controlled to perform a display operation.

For example, the display device provided by at least one embodiment of the present disclosure may be any product or component having a display function such as a liquid crystal display, an electronic paper, a mobile phone, a tablet, a television, a display, a notebook computer, a digital photo frame, and a navigator.

The beneficial effects of the display device provided by at least one embodiment of the present disclosure are the same as those of the direct type backlight described above, which are not described herein again.

What are described above is related to the illustrative embodiments of the disclosure only and not limitative to the scope of the disclosure; the scopes of the disclosure are defined by the accompanying claims.

What is claimed is:

1. A light source, comprising:
    a light emitting module comprising a substrate and a plurality of light emitting units arranged on the substrate; and
    a lens film layer positioned on a light emitting side of the light emitting module, wherein one side of the lens film layer away from the substrate is provided with a plurality of collimating structures arranged in an array, and each of the collimating structures comprises at least one convex surface structure,
wherein the plurality of collimating structures are in one-to-one correspondence with the plurality of light emitting units, and an area of an orthographic projection of each of light emitting units on the substrate is within an area of an orthographic projection of corresponding one of the collimating structures on the substrate, and
wherein each of the collimating structures comprises a first convex surface structure and at least one annular convex surface structure arranged around the first convex surface structure, and a focal point of the first convex surface structure coincides with a focal point of the at least one annular convex surface structure.

2. The light source according to claim 1, wherein a light emitting surface of the light emitting units is disposed in direct contact with a light incident surface of the lens film layer.

3. The light source according to claim 1, wherein the annular convex surface structure is disposed around the first convex surface structure.

4. The light source according to claim 1, wherein the focal point of the first convex surface structure coincides with a light incident surface of the lens film layer.

5. The light source according to claim 1, wherein a radius of curvature of the annular convex surface structure is equal to a radius of curvature of the first convex surface structure.

6. The light source according to claim 1, wherein a plurality of blind holes arranged in an array are disposed on one side of the lens film layer close to the substrate.

7. The light source according to claim 6, wherein the plurality of light emitting units are disposed in one-to-one correspondence within the plurality of blind holes.

8. The light guiding structure of claim 1, further comprising:
a prism film layer positioned on one side of the lens film layer away from the substrate.

9. The light source according to claim 8, wherein a plurality of first bench-shaped protrusion structures arranged in an array are disposed on one side of the prism film layer close to the lens film layer,
the plurality of the first bench-shaped structure are in one-to-one correspondence with the plurality of collimating structures, and
an area where each of collimating structures is located is within an area of an orthographic projection of corresponding one of the first bench-shaped protrusion structures on the lens film layer.

10. The light source according to claim 9, wherein a plurality of second bench-shaped protrusion structures arranged in an array are disposed on one side of the prism film layer away from the lens film layer,
the plurality of the second bench-shaped structure are in one-to-one correspondence with the plurality of first bench-shaped structures, and
an orthographic projection of each of the second bench-shaped protrusion structures on the lens film layer coincides with an orthographic projection of corresponding one of the first bench-shaped protrusion structures on the lens film layer.

11. The light source according to claim 10, wherein each of the first bench-shaped protrusion structures has a first surface parallel to an arrangement surface of the plurality of light emitting units, and an orthographic projection of the first convex surface structure of each of the collimating structures on the first bench-shaped protrusion structures coincides with the first surface; and
each of the second bench-shaped protrusion structures has a second surface parallel to the arrangement surface of the plurality of light emitting units, and an orthographic projection of the first convex surface structure of each of the collimating structures on the second bench-shaped protrusion structures coincides with the second surface.

12. The light source according to claim 10, wherein the first bench-shaped protrusion structures and the second bench-shaped protrusion structures are both prismatic structures.

13. The light source according to claim 10, wherein the first bench-shaped protrusion structures and the second bench-shaped protrusion structures are both truncated cone structure.

14. A display device, comprising the light source according to claim 1.

15. A method of manufacturing a light source, the method comprising:
providing a light emitting module, the light emitting module comprising a substrate and a plurality of light emitting units arranged on the substrate; and
providing a lens film layer on a light emitting side of the light emitting module,
wherein one side of the lens film layer away from the substrate is provided with a plurality of collimating structures arranged in an array, and each of the collimating structures comprises at least one convex surface structure,
wherein the plurality of collimating structures are in one-to-one correspondence with the plurality of light emitting units, and an area of an orthographic projection of each of light emitting units on the substrate is within an area of an orthographic projection of corresponding one of the collimating structures on the substrate,
wherein each of the collimating structures comprises a first convex surface structure and at least one annular convex surface structure arranged around the first convex surface structure, and
wherein a focal point of the first convex surface structure coincides with a focal point of the at least one annular convex surface structure.

16. The method according to claim 15, further comprising:
providing a prism film layer on one side of the lens film layer away from the substrate.

17. The method according to claim 16, wherein a plurality of first bench-shaped protrusion structures arranged in an array are disposed on one side of the prism film layer close to the lens film layer,
the plurality of the first bench-shaped structure is in one-to-one correspondence with the plurality of collimating structures, and
an area where each of the collimating structures is located is within an area of an orthographic projection of corresponding one of the first bench-shaped protrusion structures on the lens film layer.

18. The method according to claim 17, wherein a plurality of second bench-shaped protrusion structures arranged in an array are disposed on one side of the prism film layer away from the lens film layer,
the plurality of the second bench-shaped structure is in one-to-one correspondence with the plurality of first bench-shaped structures, and an orthographic projection of each of the second bench-shaped protrusion structures on the lens film layer coincides with an orthographic projection of corresponding one of the first bench-shaped protrusion structures on the lens film layer.

19. A light source, comprising:
a light emitting module comprising a substrate and a plurality of light emitting units arranged on the substrate;
a lens film layer positioned on a light emitting side of the light emitting module, wherein one side of the lens film layer away from the substrate is provided with a plurality of collimating structures arranged in an array, and each of the collimating structures comprises at least one convex surface structure; and
a prism film layer positioned on one side of the lens film layer away from the substrate,
wherein the plurality of collimating structures are in one-to-one correspondence with the plurality of light emitting units, and an area of an orthographic projection of each of light emitting units on the substrate is within an area of an orthographic projection of corresponding one of the collimating structures on the substrate,
wherein a plurality of first bench-shaped protrusion structures arranged in an array are disposed on one side of the prism film layer close to the lens film layer,
wherein the plurality of the first bench-shaped structures are in one-to-one correspondence with the plurality of collimating structures, and
wherein an area where each of the collimating structures is located is within an area of an orthographic projection of a corresponding one of the first bench-shaped protrusion structures on the lens film layer.

20. The light source according to claim 19, wherein a plurality of second bench-shaped protrusion structures arranged in an array are disposed on one side of the prism film layer away from the lens film layer,
the plurality of the second bench-shaped structure are in one-to-one correspondence with the plurality of first bench-shaped structures, and
an orthographic projection of each of the second bench-shaped protrusion structures on the lens film layer coincides with an orthographic projection of corresponding one of the first bench-shaped protrusion structures on the lens film layer.

\* \* \* \* \*